US010616501B2

United States Patent
Wang (10) Patent No.: US 10,616,501 B2
(45) Date of Patent: *Apr. 7, 2020

(54) DC-IRIS CONTROL SYSTEM

(71) Applicant: Ambarella International LP, Santa Clara, CA (US)

(72) Inventor: Bin Wang, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/251,487

(22) Filed: Jan. 18, 2019

(65) Prior Publication Data

US 2019/0158714 A1     May 23, 2019

Related U.S. Application Data

(63) Continuation of application No. 15/468,343, filed on Mar. 24, 2017, now Pat. No. 10,225,487.

(30) Foreign Application Priority Data

Mar. 3, 2017    (CN) .......................... 2017 1 0123814

(51) Int. Cl.
    *H04N 5/238*      (2006.01)
    *H04N 5/235*      (2006.01)
    *H04N 5/232*      (2006.01)

(52) U.S. Cl.
    CPC ........... *H04N 5/238* (2013.01); *H04N 5/2351* (2013.01)

(58) Field of Classification Search
    CPC ............................. H04N 5/238; H04N 5/2351
    See application file for complete search history.

(56) References Cited

U.S. PATENT DOCUMENTS

| | | | |
|---|---|---|---|
| 5,333,011 A | 7/1994 | Thompson | 348/363 |
| 5,572,629 A | 11/1996 | Choi | 706/52 |
| 10,225,487 B2 * | 3/2019 | Wang | H04N 5/2351 |
| 2009/0198351 A1 | 8/2009 | Kitagawa | 700/42 |
| 2016/0105595 A1 | 4/2016 | Huang | 348/363 |

* cited by examiner

*Primary Examiner* — Albert H Cutler
(74) *Attorney, Agent, or Firm* — Christopher P. Maiorana, PC (57) ABSTRACT

An apparatus comprising an interface to a lens iris and a processor. The processor may be configured to present to the interface a signal configured to adjust the lens iris in response to a luma value received from an image sensor. The processor may be configured to adjust coefficient values for the signal. The coefficient values may be adjusted to converge a luma difference value to a set point. The processor may implement rules to determine the coefficient values. The rules may determine the coefficient values based on flexible relationships between input values based on the luma difference value and adjustment values for the coefficient values.

16 Claims, 9 Drawing Sheets

|  | NB_ED | NM_ED | NS_ED | Z0_ED | PS_ED | PM_ED | PB_ED |
|---|---|---|---|---|---|---|---|
| NB_E | PB | PB | PB | PB | PM | PS | Z0 |
| NM_E | PB | PB | PB | PB | PM | Z0 | Z0 |
| NS_E | PM | PM | PM | PM | Z0 | PS | PS |
| Z0_E | PM | PM | PS | Z0 | NS | NS | NM |
| PS_E | PS | PS | Z0 | NS | NM | NM | NM |
| PM_E | PS | Z0 | NS | NM | NM | NM | NB |
| PB_E | Z0 | Z0 | NM | NM | NM | NB | NB |

FIG. 5

|  | NB_ED | NM_ED | NS_ED | Z0_ED | PS_ED | PM_ED | PB_ED |
|---|---|---|---|---|---|---|---|
| NB_E | NB | NB | NM | NM | NS | Z0 | Z0 |
| NM_E | NB | NB | NM | NS | NS | Z0 | Z0 |
| NS_E | NB | NM | NS | NS | Z0 | PS | PS |
| Z0_E | NM | NM | NS | Z0 | PS | PM | PM |
| PS_E | NM | NS | Z0 | PS | PS | PM | PB |
| PM_E | Z0 | Z0 | PS | NM | PM | PB | PB |
| PB_E | Z0 | Z0 | PS | PM | PM | PB | PB |

FIG. 6

|  | NB_ED | NM_ED | NS_ED | Z0_ED | PS_ED | PM_ED | PB_ED |
|---|---|---|---|---|---|---|---|
| NB_E | PS | NS | NB | NB | NB | NM | PS |
| NM_E | PS | NS | NB | NM | NM | NS | Z0 |
| NS_E | Z0 | NS | NM | NS | NS | NS | Z0 |
| Z0_E | Z0 | NS | NS | NS | NS | NS | Z0 |
| PS_E | Z0 | Z0 | Z0 | Z0 | Z0 | Z0 | Z0 |
| PM_E | Z0 | PS | PS | PS | PS | PS | PB |
| PB_E | PB | PM | PM | PM | PS | PS | PB |

DC-IRIS CONTROL SYSTEM

This application relates to U.S. Ser. No. 15/468,343, filed Mar. 24, 2017 which relates to Chinese Application No. 201710123814.8, filed Mar. 3, 2017, each of which are hereby incorporated by reference in their entirety.

FIELD OF THE INVENTION

The invention relates to cameras generally and, more particularly, to a method and/or apparatus for implementing a DC-Iris control system.

BACKGROUND

A DC-Iris control system is widely used in Security Internet Protocol (IP) cameras. A DC-Iris is a motor-driven, automatically adjustable iris opening that responds to changes in light levels. An analog signal is used to control the iris opening. Circuitry is implemented to convert the analog signal into motor control signals. In a DC-iris lens, the circuit resides inside the camera.

The image quality captured by a camera is dependent on getting the right iris opening (i.e., aperture). A security IP camera is often used in various lighting environments. In order to optimize image quality, a camera needs to have control over the position of the iris opening.

Proportional-Integral-Derivative (PID) control systems are used to control a DC-Iris lens. A proportional coefficient has the effect of reducing the rise time and will reduce, but not eliminate, the steady-state error. An integral coefficient has the effect of eliminating the steady-state error for a constant or step input, but may make the transient response slower. A derivative coefficient has the effect of increasing the stability of the system, reducing the overshoot, and improving the transient response. PID coefficients may be dependent on each other and changing one of these variables can change the effect of the other two.

PID coefficients can be selected to meet a target of reaching set point quickly while reducing overshoot and flicker. These targets also need both good dynamic characteristic and static characteristic of the control system. Conventional PID controllers are unable to meet these targets while having good dynamic characteristics and static characteristics. Furthermore, there are many types of DC-Iris lenses implemented in camera products lines. Each type of DC-Iris needs a specified set of PID control coefficients. If a mismatched DC-Iris lens is mounted, the PID coefficients may not work well. End users and distributors may change a DC-Iris lens for a camera to achieve a desired field of view (FOV) or focus.

It would be desirable to implement a DC-Iris control system.

SUMMARY

The invention concerns an apparatus comprising an interface to a lens iris and a processor. The processor may be configured to present to the interface a signal configured to adjust the lens iris in response to a luma value received from an image sensor. The processor may be configured to adjust coefficient values for the signal. The coefficient values may be adjusted to converge a luma difference value to a set point. The processor may implement rules to determine the coefficient values. The rules may determine the coefficient values based on flexible relationships between input values based on the luma difference value and adjustment values for the coefficient values.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a DC-Iris control system that may (i) adjust coefficient values for a control system, (ii) implement fuzzy rules, (iii) converge a deviation to a set point faster, (iv) reduce overshoot in a DC-Iris control system, (v) be compatible with different DC-Iris lens types, (vi) be implemented at low cost, (vii) automatically adjust coefficients online and/or (viii) be implemented as one or more integrated circuits.

Figure 1:
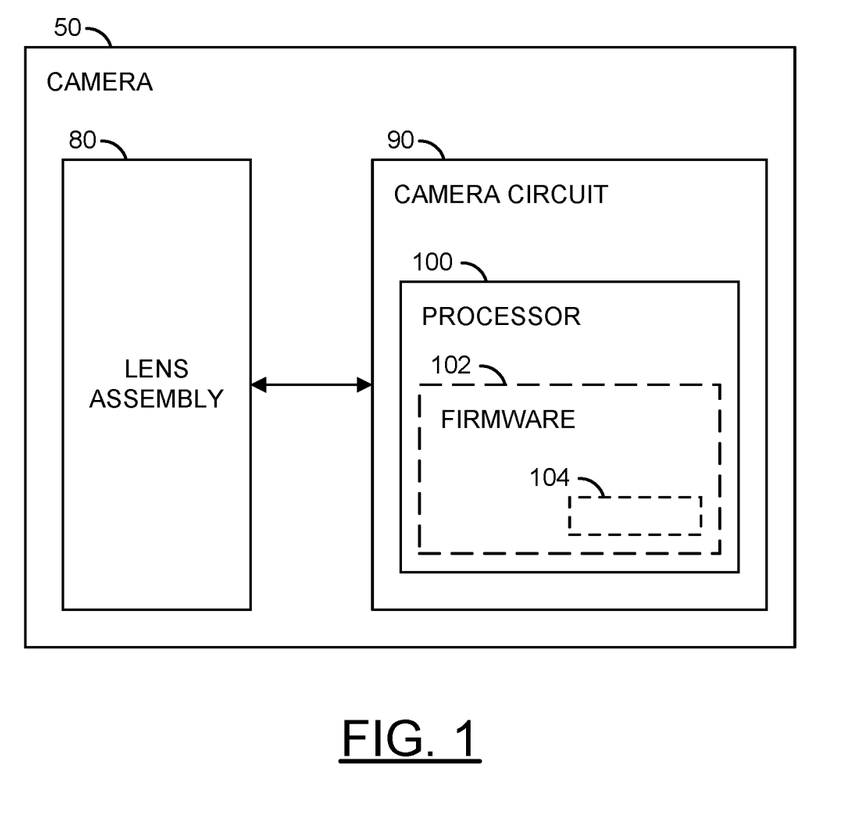
FIG. 1 is a block diagram illustrating the present invention in the context of a camera.

Referring to FIG. 1, a block diagram illustrating the present invention in the context of a camera 50 is shown. The camera 50 may comprise a block (or circuit) 80 and/or a block (or circuit) 90. The circuit 80 may be a lens assembly. The circuit 90 may be a camera circuit. In some embodiments, the camera circuit 90 may comprise one or more circuits configured to implement a digital video camera, a digital still camera or a hybrid digital video/still camera, collectively and individually referred to as digital cameras. In an example, the electronics of the camera circuit 90 may be implemented as one or more integrated circuits. For example, an application specific integrated circuit (ASIC) or system-on-a-chip (SoC) may be used to implement a processing portion of the camera circuit 90. The camera 50 may comprise other components (not shown). The number, type and/or function of the components of the camera 50 may be varied according to the design criteria of a particular implementation.

The camera circuit 90 may comprise a block (or circuit) 100. The circuit 100 may be a processor. The processor 100 may be implemented as an embedded processor (e.g., ARM, etc.). The processor 100 may comprise a block (or circuit) 102. The circuit 102 may be firmware. The firmware 102 may comprise a block (or circuit) 104. The block 104 may implement rules. In one example, the rules may implement fuzzy Proportional-Integral-Derivative (PID) control system rules. The rules 104 may be configured to implement fuzzy control logic to adjust (e.g., increase and/or decrease) coefficient values. The rules 104 may determine coefficient values (e.g., PID coefficients) based on flexible relationships between input values (e.g., a luma difference value) and adjustment values for the coefficient values. Each of the camera circuit 90, the processor 100, the firmware 102 and/or the rules 104 may comprise other components (not shown). The number, type and/or functions of the components of the camera circuit 90, the processor 100, the firmware 102 and/or the rules 104 may be varied according to the design criteria of a particular implementation.

The rules 104 may implement a fuzzy PID control system for an automatic DC-Iris lens (e.g., a DC-Iris control system). In some embodiments, the camera 50 may implement a Security Internet Protocol (IP) camera. For example, the security IP camera 50 may be implemented in a location that may have varying lighting levels. The DC-Iris may be implemented to enable the lens assembly 80 to automatically adjust a lens aperture to ensure a desirable level of light. The processor 100 may implement the rules 104 to provide control for the automatic DC-iris control system.

Figure 2:
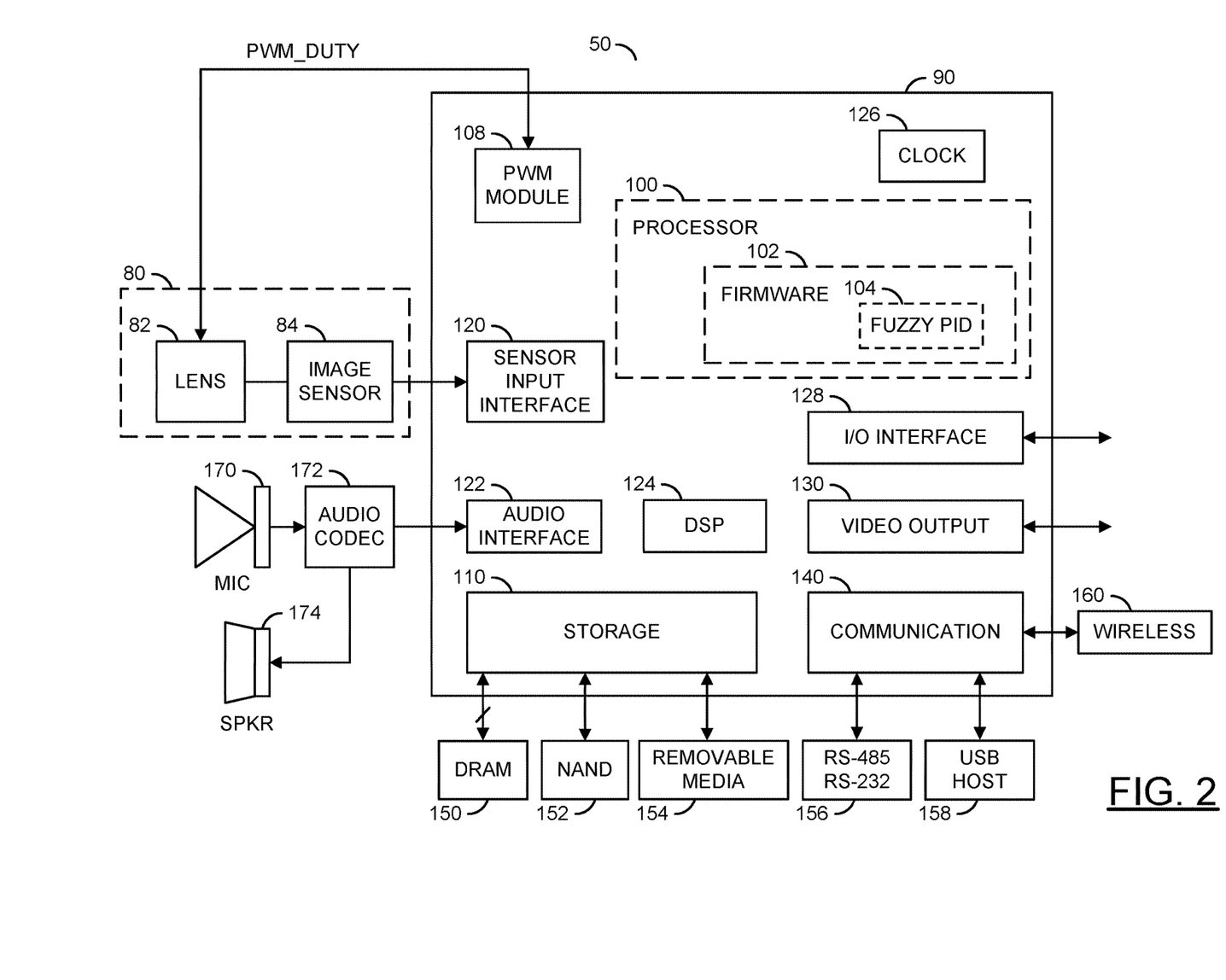
FIG. 2 is a block diagram illustrating a camera system.

Referring to FIG. 2, a block diagram of a camera circuit 90 is shown illustrating an example implementation of a camera/recorder system (or apparatus). The lens assembly 80 is shown connected to the camera circuit 90. In some embodiments, the lens assembly 80 may be a component of the camera circuit 90 (e.g., a SoC component). In some embodiments, the lens assembly 80 may be a separate component from the camera circuit 90 (e.g., the lens assembly may be an interchangeable component compatible with the camera circuit 90). In some embodiments, the lens assembly 80 may be part of a separate camera connected to the processing portion of the circuit 90 (e.g., via a video cable, a high definition media interface (HDMI) cable, a universal serial bus (USB) cable, an Ethernet cable, or wireless link).

The lens assembly 80 may comprise a block (or circuit) 82 and/or a block (or circuit) 84. The circuit 82 may be a lens. The circuit 84 may be an image sensor. The lens assembly 80 may comprise other components (not shown). The number, type and/or function of the components of the lens assembly 80 may be varied according to the design criteria of a particular implementation.

The lens 82 may capture and/or focus light input received from the environment near the camera 50. The lens 82 may capture and/or focus light for the image sensor 84. The lens 82 may be implemented as an optical lens. The lens 80 may provide a zooming feature and/or a focusing feature. The lens 82 may be implemented with additional circuitry (e.g., motors) to adjust a direction, zoom and/or aperture of the lens 82. The lens 82 may be directed, tilted, panned, zoomed and/or rotated to provide a targeted view of the environment near the camera 50.

The image sensor 84 may receive light from the lens 82. The image sensor 84 may be configured to transform the received focused light into digital data (e.g., bitstreams). In some embodiments, the image sensor 84 may perform an analog to digital conversion. For example, the image sensor 84 may perform a photoelectric conversion of the focused light received from the lens 82. The processor 100 may transform the bitstreams into video data, video files and/or video frames (e.g., human-legible content).

In various embodiments, the camera circuit 90 may comprise the processor 100, a block (or circuit) 108, a block (or circuit) 110, a block (or circuit) 120, a block (or circuit) 122, a block (or circuit) 124, a block (or circuit) 126, a block (or circuit) 128, a block (or circuit) 130 and/or a block (or circuit) 140. The circuit 108 may be a pulse-width modulation (PWM) module (or interface). The circuit 110 may be a storage module. The circuit 120 may be a sensor input (or interface). The circuit 122 may be an audio interface. The circuit 124 may be a digital signal processing (DSP) module. The circuit 126 may be a clock circuit (e.g., a real time clock and watchdog timer (RTC/WDT)). The circuit 128 may be an input/output (I/O) interface. The circuit 130 may be a video output module. The circuit 140 may be a communication module.

The camera circuit 90 is shown connected to a block (or circuit) 150, a block (or circuit) 152, a block (or circuit) 154, a block (or circuit) 156, a block (or circuit) 158, a block (or circuit) 160, a block (or circuit) 170, a block (or circuit) 172 and/or a block (or circuit) 174. The circuit 150 may be a dynamic random access memory (DRAM). The circuit 152 may be a nonvolatile memory (e.g., NAND flash memory, NOR flash memory, etc.). The circuit 154 may be an interface for connecting to a removable media (e.g., SD—secure digital media, SDXC—secure digital extended capacity media, etc.). The circuit 156 may be one or more serial interfaces (e.g., RS-485, RS-232, etc.). The circuit 158 may be an interface for connecting to or acting as a universal serial bus (USE) host. The circuit 160 may be a wireless interface for communicating with a user device (e.g., a smart phone, a computer, a tablet computing device, etc.). The circuit 170 may be a microphone for capturing audio. The circuit 172 may be an audio codec for recording audio in a particular format. The circuit 174 may be a speaker for playing audio. In the embodiment shown, the circuits 150-174 are implemented as components external to the camera circuit 90. In some embodiments, the circuits 150-174 may be components on-board the camera circuit 90.

The PWM module 108 may be configured to generate a signal (e.g., PWM_DUTY). The signal PWM_DUTY may be configured to adjust the DC-Iris for the lens assembly 80. Characteristics of the signal PWM_DUTY may be determined based the PID coefficients and/or adjustments to the PID coefficients calculated by the processor 100 and/or the rules 104. The PWM module 108 may provide an interface to the lens assembly 80 and/or a lens iris (e.g., DC-Iris). The interface 108 may enable the camera circuit 90 to send the signal PWM_DUTY.

The storage module 110 may be configured to manage one or more types of storage and/or data access. In one example, the storage module 110 may implement a direct memory access (DMA) engine. In another example, the storage module 110 may implement a secure digital (SD) card interface (e.g., to connect to the removable media 154). In various embodiments, programming code (e.g., executable instructions for controlling various processors and encoders of the camera circuit 90) may be stored in one or more of the memories (e.g., the DDR 150, the NAND 152, etc.). When executed by the processor 100, the programming code generally causes one or more components in the camera circuit 90 to configure video synchronization operations and start video frame processing operations. The resulting compressed video signal may be presented to the storage module 110, the video output 130 and/or communication module 140. The storage module 110 may store past and/or present values used to generate the signal PWM_DUTY (e.g., luma values, PID coefficient values, adjustment values, etc.)

The sensor input 120 may be configured to send/receive data to/from the image sensor 84. In one example, the sensor input 120 may comprise an image sensor input interface. The sensor input 120 may be configured to transmit captured images (e.g., light data) from the image sensor 84 to the DSP module 124 and/or the processor 100. The data received by the sensor input 120 may be used by the DSP 124 to determine a luma value from the image sensor 84. The sensor input 120 may provide an interface to the lens assembly 80 and/or a lens iris (e.g., DC-Iris). The interface 120 to the lens assembly 80 may enable the camera circuit 90 to receive the luma value and/or captured images.

The audio interface 122 may be configured to send/receive audio data. In one example, the audio interface 122 may implement an audio inter-IC sound (I2S) interface. The audio interface 122 may be configured to send/receive data in a format implemented by the audio codec 172.

The DSP module 124 may be configured to process digital signals. The DSP module 124 may comprise an image digital signal processor (DSP), a video DSP and/or an audio DSP. The DSP module 124 may be configured to receive information (e.g., light data values captured by the image sensor 84) from the sensor input 120. The DSP module 124 may be configured to determine the luma value from the information received from the sensor input 120. The DSP module 124 may be further configured to determine a difference between the current luma value and a standard luma value and/or determine a differential of the difference between the current luma value and the standard luma value.

The I/O interface 128 may be configured to send/receive data. The data sent/received by the I/O interface 128 may be miscellaneous information and/or control data. In one example, the I/O interface 128 may implement a general purpose input/output (GPIO). In another example, the I/O interface 128 may implement an analog-to-digital converter (ADC) module. In yet another example, the I/O interface 128 may implement an infrared (IR) remote interface. In still another example, the I/O interface 128 may implement a synchronous data communications interface (IDC SPI/SSI).

The video output module 130 may be configured to send video data. For example, the camera 50 may be connected to an external device (e.g., a TV, a monitor, a laptop computer, a tablet computing device, etc.). The video output module 130 may implement a high-definition multimedia interface (HDMI), an LCD/TV/Parallel interface and/or a DisplayPort interface.

The communication module 140 may be configured to send/receive data. The data sent/received by the communication module 140 may be formatted according to a particular protocol (e.g., Bluetooth, USB, Wi-Fi, UART, etc.). In one example, the communication module 140 may implement a secure digital input output (SDIO) interface. The communication module 140 may include support for wireless communication by one or more wireless protocols such as Bluetooth®, ZigBee®, Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20. The communication module 140 may also include support for communicating using one or more of the universal serial bus protocols (e.g., USB 1.0, 2.0, 3.0, etc.). The camera circuit 100 may also be configured to be powered via the USB connection. However, other communication and/or power interfaces may be implemented accordingly to meet the design criteria of a particular application.

In some embodiments, the sensor input interface 120 may be configured to receive a luma value from the image sensor 84. In some embodiments, the sensor input interface 120 may be configured to receive light information from the image sensor 84 that may be provided to the DSP module 124 to determine the luma value. The sensor input interface 120 and/or the DSP module 124 may present the luma value to the processor 100. The rules 104 may be configured to determine the PID coefficients and/or make adjustments to the PID coefficient values based on the luma value.

Figure 3:
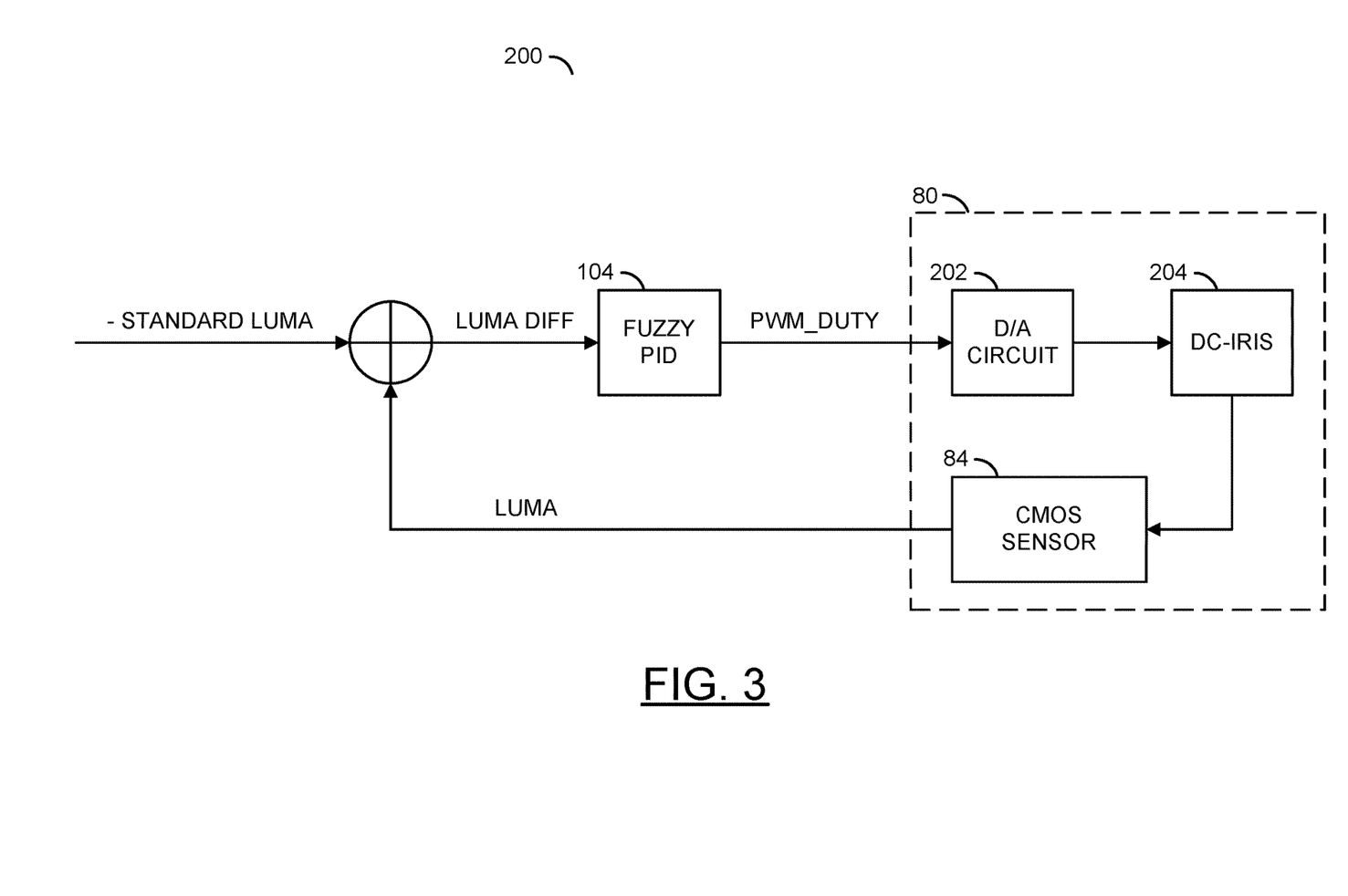
FIG. 3 is a block diagram illustrating a control system.

Referring to FIG. 3, a block diagram illustrating a control system 200 is shown. The processor 100 may be configured to implement the control system 200. The control system 200 may be configured to control components of the lens assembly 80 and/or receive information from the components of the lens assembly 80. The control system 200 may comprise the fuzzy PID rules 104, a block (or circuit) 202, a block (or circuit) 204 and/or the image sensor 84 (e.g., a CMOS sensor). The circuit 202 may be a digital-to-analog (D/A) circuit. The circuit 204 may be a DC-Iris circuit. The digital-to-analog circuit 202 may comprise a current amplifier and/or comparator circuit to enable the signal PWM_DUTY to drive a coil of the DC-Iris 204.

The control system 200 may receive feedback from the image sensor 84. The feedback may be the luma value (e.g., a current luma value). In some embodiments, the DSP module 124 may determine the luma value based on information received from the CMOS image sensor 84. The processor 100 may receive a standard luma value. The standard luma value may be a known (or pre-determined) value. For example, the standard luma value may be stored by the storage module 110 and/or in the firmware 102. The processor 100 may be configured to calculate the difference between the standard luma and the current luma value (e.g., a luma difference value). The luma difference value (e.g., Luma_Diff) may be the "error" of the control system 200. A set-point for the control system 200 may be a Luma_Diff value of zero (e.g., the control system 200 may correct the "error" by reducing the luma difference to zero). For example, the control system 200 may be configured to adjust the PID coefficients in order to get the Luma_Diff value as close to zero as possible, as quickly as possible.

The signal PWM_DUTY may be the controller of the control system 200. The processor 100 may be configured to generate the signal PWM_DUTY based on the Luma_Diff value. The fuzzy PID rules 104 may be configured to determine the adjustments to the PID coefficients based on the Luma_Diff value. In response to the adjustments to the PID coefficients determined by the rules 104, the processor 100 may determine the updated PID coefficients. Based on the updated PID coefficients, the adjustment values for the PID coefficients and/or other information, the processor 100 may determine a duty cycle for the PWM signal PWM_DUTY. The signal PWM_DUTY may be generated by the PWM module 108 and presented to the lens assembly 80. The current amplifier and/or comparator circuit of the digital-to-analog circuit 202 may be configured to enable the PWM signal PWM_DUTY to drive the coil of the DC-Iris 204 (e.g., to adjust the aperture of the lens 82).

Figure 4:
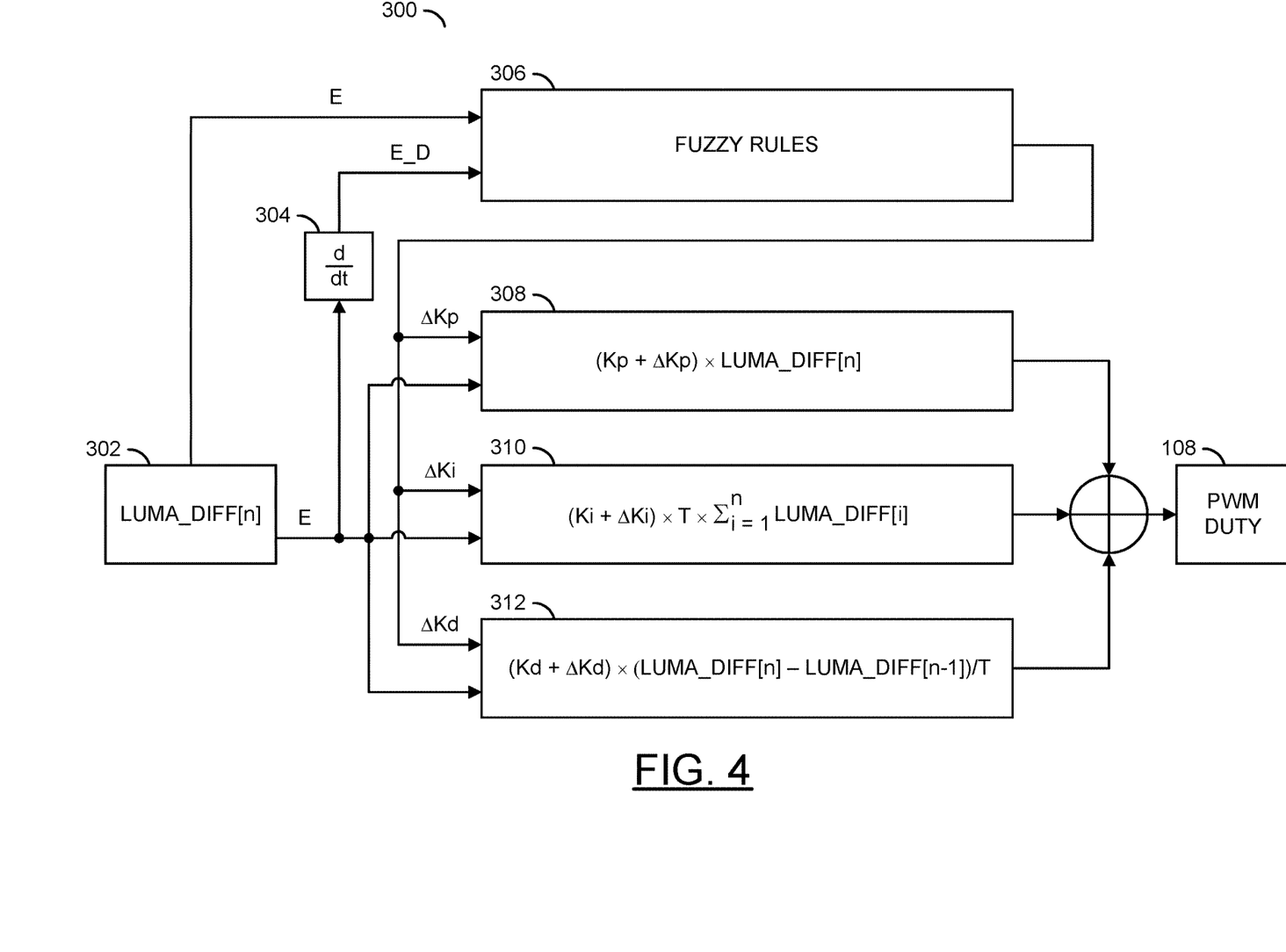
FIG. 4 is a block diagram illustrating adjusting coefficient values for a pulse width modulation signal.

Referring to FIG. 4, a block diagram 300 illustrating adjusting coefficient values for a pulse width modulation signal is shown. The block diagram 300 may be conceptual blocks for the fuzzy PID rules 104 implemented by the processor 100 and/or the firmware 102. The conceptual blocks 300 for the fuzzy PID rules 104 may comprise a block (or circuit) 302, a block (or circuit) 304, a block (or circuit) 306, a block (or circuit) 308, a block (or circuit) 310, a block (or circuit) 312 and/or the PWM module 108. The block 302 may be the Luma_Diff value. The block 304 may be a differentiator block. The block 306 may implement fuzzy logic and/or rules. The block 308 may perform a calculation based on the determined adjustment to the proportional PID coefficient. The block 310 may perform a calculation based on the determined adjustment to the integral PID coefficient. The block 312 may perform a calculation based on the determined adjustment to the derivative PID coefficient.

The block 302 may provide the current luma difference value at time n (e.g., Luma_Diff[n]). The Luma_Diff[n] value (e.g., E) may be presented to the differentiator block 304, the fuzzy rules block 306, the proportional PID coefficient block 308, the integral PID coefficient block 310 and/or the derivative PID coefficient block 312. In one example, the current luma difference value E may be determined by the DSP module 124.

The block 304 may provide the differential of the current luma difference value Luma_Diff[n] (e.g., E_D). The differential of the current luma difference value E_D may be presented to the fuzzy rules block 306. In one example, the differential of the current luma difference value E_D may be determined by the DSP module 124. For discrete time serials the value E_D may be determined by a formula (e.g., EQ 1).

$$E\_D = \text{Luma\_Diff}[n] - \text{Luma\_Diff}[n-1], \text{ where } n > 1 \quad (EQ\ 1)$$

The fuzzy rules block 306 may implement the fuzzy PID control system rules 104. In one example, the fuzzy PID rules 104 may be stored by the firmware 102 and performed by the processor 100. The fuzzy rules block 306 may receive the current luma difference value E and the differential of the luma difference value E_D. The fuzzy rules block 306 may determine adjustment values to the PID coefficients. The adjustment values may comprise a proportional adjustment value (e.g., ΔKp), an integral adjustment value (e.g., ΔKi) and/or a derivative adjustment value (e.g., ΔKd). The fuzzy rules block 306 may present the proportional adjustment value ΔKp to the proportional PID coefficient block 308. The fuzzy rules block 306 may present the integral adjustment value ΔKi to the integral PID coefficient block 310. The fuzzy rules block 306 may present the derivative adjustment value ΔKd to the derivative PID coefficient block 312.

The fuzzy rules block 306 may implement flexible relationships between the input values based on the luma difference value Luma_Diff and the adjustment values (e.g., ΔKp, ΔKi and/or ΔKd) for the coefficient values (e.g., Kp, Ki and/or Kd). For example, the input values based on the luma difference value may be the luma difference value E and the differential of the luma difference value E_D. The fuzzy rules block 306 may separate values for the luma difference value E into various levels. The fuzzy rules block 306 may separate values for the differential of the luma difference value E_D into various levels. The fuzzy rules block 306 may separate values for each of the adjustment values (e.g., ΔKp, ΔKi and/or ΔKd) into various levels. The fuzzy rules block 306 may select the adjustment values (e.g., ΔKp, ΔKi and/or ΔKd) from the adjustment value levels based on the level of the luma difference value E and/or the level of the differential of the luma difference value E_D. The various levels may be described in more detail in association with FIGS. 5-7.

The proportional PID coefficient block 308 may receive the current luma difference value E and/or the proportional adjustment value ΔKp. The proportional PID coefficient block 308 may perform a calculation to determine a value (e.g., Val_1) used to calculate the signal PWM_DUTY. The calculation may be determined based on the current value of the proportional coefficient value Kp, the proportional adjustment value ΔKp and/or the luma difference value E. The calculation performed by the proportional PID coefficient block 308 may be used by the processor 100 to determine the characteristics of the PWM signal PWM_DUTY to be generated by the PWM module 108. In one example, the calculation performed by the proportional PID coefficient block 308 may be determined by a formula (e.g., EQ 2).

$$\text{Val\_1} = (Kp + \Delta Kp) \times \text{Luma\_Diff}[n] \quad (EQ\ 2)$$

The integral PID coefficient block 310 may receive the current luma difference value E and/or the integral adjustment value ΔKi. The integral PID coefficient block 310 may perform a calculation to determine another value (e.g., Val_2) used to calculate the signal PWM_DUTY. The calculation may be determined based on the current value of the integral coefficient value Ki, the integral adjustment value ΔKi, a period value (e.g., T) and/or one or more of the current and previous values of the luma difference value E. The calculation performed by the integral PID coefficient block 310 may be used by the processor 100 to determine the characteristics of the PWM signal PWM_DUTY to be generated by the PWM module 108. In one example, the calculation performed by the integral PID coefficient block 310 may be determined by a formula (e.g., EQ 3).

$$\text{Val\_2} = (Ki + \Delta Ki) \times T \times \sum_{i=1}^{n} \text{Luma\_Diff}[i] \quad (EQ\ 3)$$

The derivative PID coefficient block 312 may receive the current luma difference value E and/or the derivative adjustment value ΔKd. The derivative PID coefficient block 312 may perform a calculation to determine yet another value (e.g., Val_3) used to calculate the signal PWM_DUTY. The calculation may be determined based on the current value of the derivative coefficient value Kd, the derivative adjustment value ΔKd, the period value T and/or one or more of the current and previous values of the luma difference value E. The calculation performed by the derivative PID coefficient block 312 may be used by the processor 100 to determine the characteristics of the PWM signal PWM_DUTY to be generated by the PWM module 108. In one example, the calculation performed by the derivative PID coefficient block 312 may be determined by a formula (e.g., EQ 4).

$$\text{Val\_3} = (Kd + \Delta Kd) \times (\text{Luma\_Diff}[n] - \text{Luma\_Diff}[n-1])/T \quad (EQ\ 4)$$

The proportional coefficient value Kp, the integral coefficient value Ki, the derivative coefficient value Kd, the period value T, the current luma difference value E and/or previous luma difference values may be stored by the storage module 110 and/or the processor 100 (e.g., using a cache memory). The period value T may be a period of a CMOS input sample where, n>1. The processor 100 may combine the value Val_1 determined by the proportional PID coefficient block 308, the value Val_2 determined by the integral PID coefficient block 310 and/or the value Val_3 determined by the derivative PID coefficient block 312. The combination of the value Val_1, the value Val_2 and the value Val_3 may be used by the processor 100 to determine the duty cycle for the PWM signal PWM_DUTY. The signal PWM_DUTY may be generated by the PWM module 108. The fuzzy PID formula of the combination of the coefficient values may be determined by a formula (e.g., EQ 5).

$$\text{duty} = \text{Val\_1} + \text{Val\_2} + \text{Val\_3} = (Kp + \Delta Kp)^* \text{Luma\_Diff}[n] + (Ki + \Delta Ki)^* T^* \sum_{i=1}^{n} \text{Luma\_Diff}[i] + (Kd + \Delta Kd)^* (\text{Luma\_Diff}[n] - \text{Luma\_Diff}[n-1])/T \quad (EQ\ 5)$$

Figure 5:
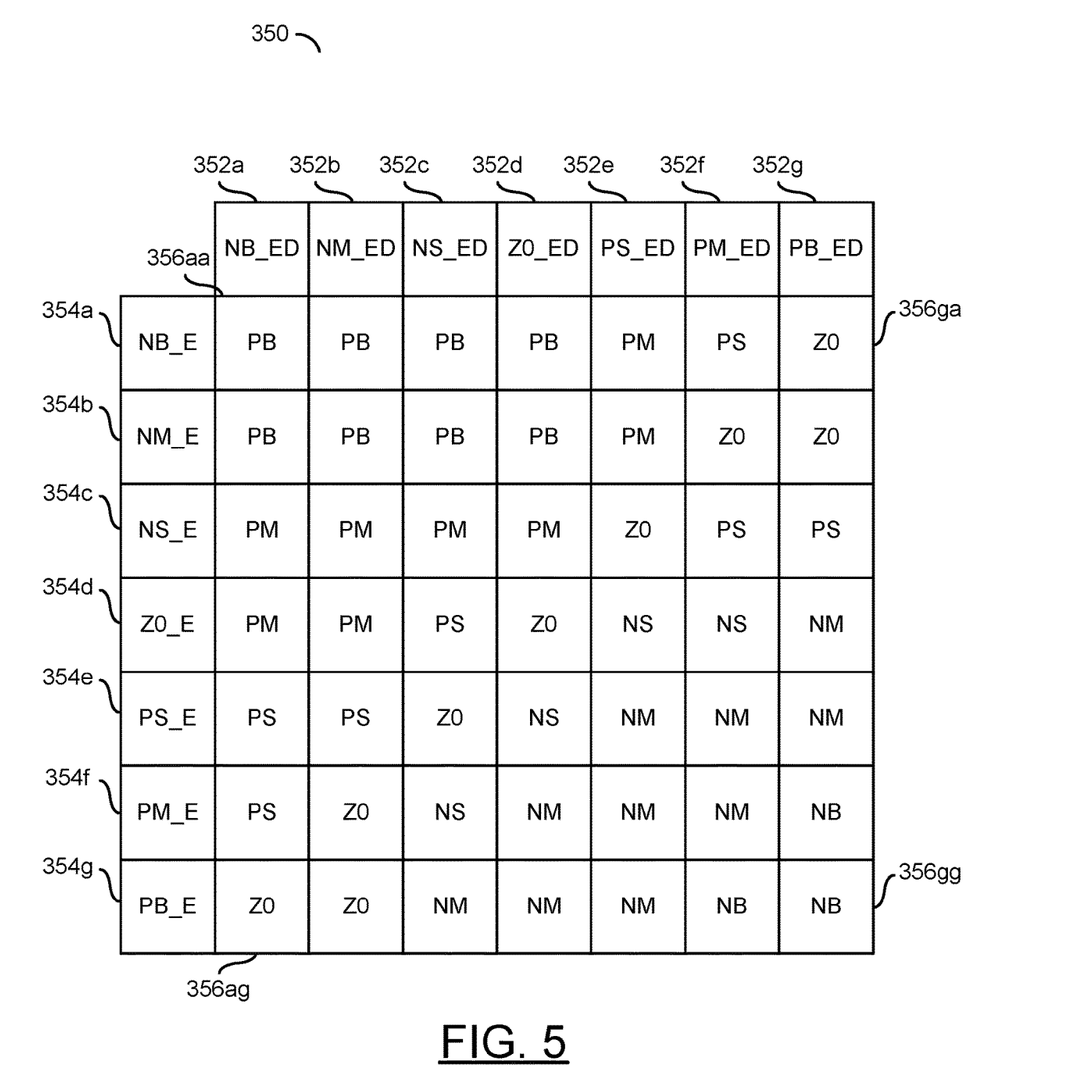
FIG. 5 is a table illustrating relationships between luma value levels and a proportional coefficient adjustment value levels.

Referring to FIG. 5, a table 350 illustrating relationships between inputs based on luma values and the output proportional coefficient adjustment value ΔKp is shown. The table 350 may comprise a row of differential of luma difference value levels 352a-352g (e.g., E_D levels). The table 350 may comprise a column of luma difference value levels 354a-354g (e.g., E levels). In the example shown, seven levels are shown for the differential of luma difference value levels 352a-352g and the luma difference value levels 354a-354g. The number of levels implemented may be varied according to the design criteria of a particular implementation.

The table 350 may comprise proportional adjustment value levels 356aa-356gg. For each combination of the differential of luma difference value levels 352a-352g and the luma difference value levels 354a-354g, there may be a corresponding one of the proportional adjustment levels 356aa-356gg. In the example shown, each of the proportional adjustment levels 356aa-356gg may be one of seven different levels. The number of proportional adjustment levels implemented may be varied according to the design criteria of a particular implementation.

In one example, the proportional adjustment level 356aa may correspond to the differential of luma difference value level 352a and the luma difference level 354a. In another example, the proportional adjustment level 356ga may correspond to the differential of luma difference value level 352g and the luma difference level 354a. In yet another example, the proportional adjustment level 356ag may correspond to the differential of luma difference value level 352a and the luma difference level 354g. In still another example, the proportional adjustment level 356fd may correspond to the differential of luma difference value level 352f and the luma difference level 354d. The proportional adjustment value ΔKp output from the fuzzy rules block 306 may be selected from one of the proportional adjustment levels 356aa-356gg. The selected one of the proportional adjustment levels 356aa-356gg may be used by the proportional PID coefficient block 308.

The rules 104 may separate E into the seven levels 354a-354g. The seven levels for the luma difference E may be Negative Big (e.g., NB_E), Negative Middle/Medium (e.g., NM_E), Negative Small (e.g., NS_E), Zero (e.g., Z0_E), Positive Small (PS_E), Positive Middle/Medium (e.g., PM_E) and/or Positive Big (e.g., PB_E). The rules 104 may separate E_D into seven levels 352a-352g. The seven levels for the differential of the luma difference ED may be Negative Big (e.g., NB_ED), Negative Middle (e.g., NM_ED), Negative Small (e.g., NS_ED), Zero (e.g., Z0_ED), Positive Small (PS_ED), Positive Middle (e.g., PM_ED) and/or Positive Big (e.g., PB_ED).

The output of fuzzy control rules block 306 may be the increase/decrease (e.g., the adjustment values ΔKp, ΔKi and/or ΔKd) of the PID control coefficients Kp, Ki and/or Kd. The table 350 may indicate the proportional coefficient adjustment levels 356aa-356gg. The rules 104 may separate the proportional coefficient adjustment levels 356aa-356gg into seven levels. The fuzzy rules block 306 may select the proportional coefficient adjustment value ΔKp from the proportional coefficient adjustment levels 356aa-356gg based on the luma difference value levels 352a-352g and the luma difference value levels 354a-354g. The seven levels for the proportional coefficient adjustment value ΔKp may be Negative Big (e.g., NB), Negative Middle (e.g., NM), Negative Small (e.g., NS), Zero (e.g., Z0), Positive Small (e.g., PS), Positive Middle (e.g., PM) and/or Positive Big (e.g., PB). For example, when the luma difference value level is NM_E (e.g., 354b) and differential of the luma difference value level is PS_ED (e.g., 352e), the corresponding proportional coefficient adjustment level may be Positive Medium (e.g., 356eb) and the proportional coefficient adjustment value ΔKp may be the PM value.

Figure 6:
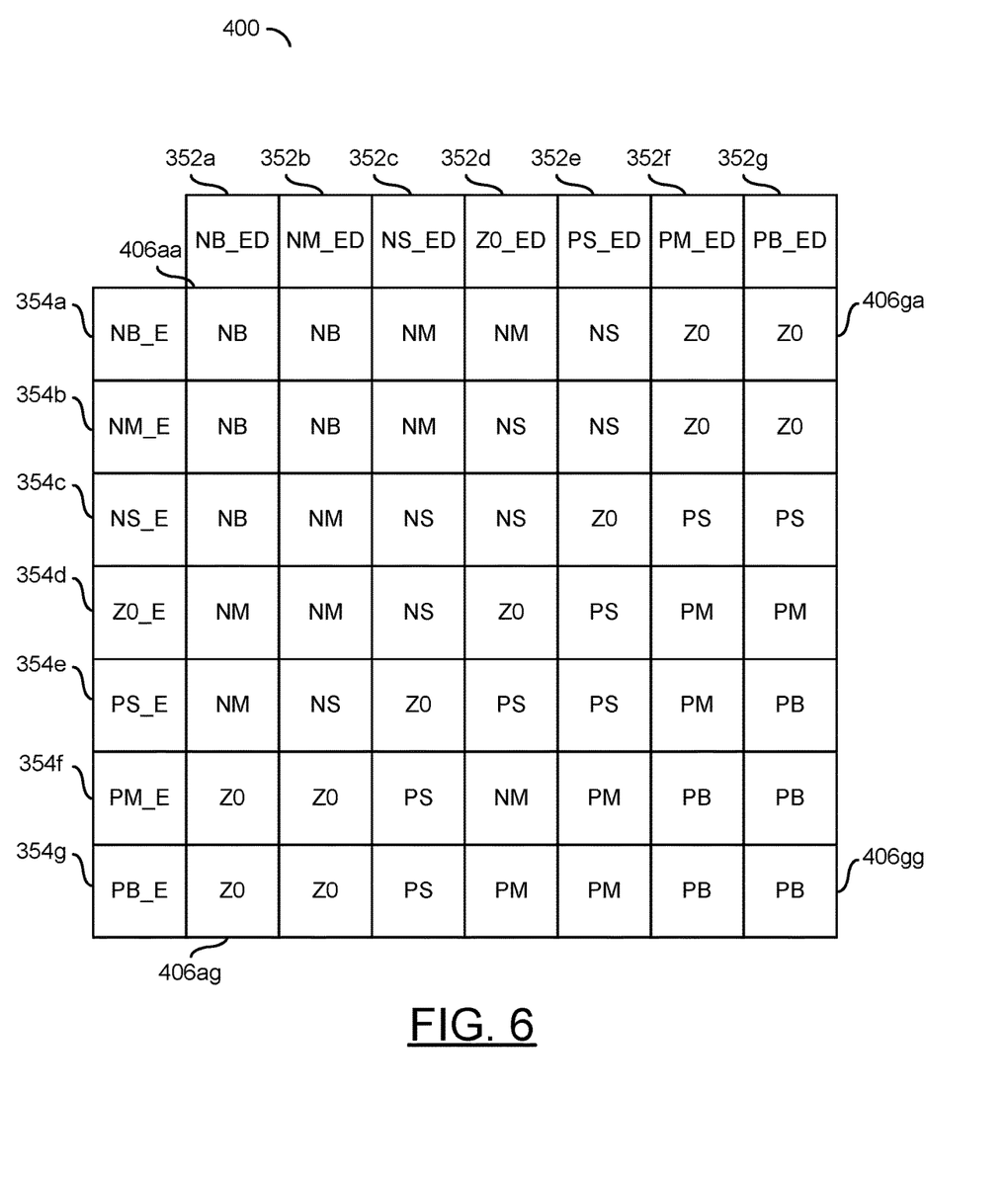
FIG. 6 is a table illustrating relationships between luma value levels and an integral coefficient adjustment value levels.

Referring to FIG. 6, a table 400 illustrating relationships between inputs based on luma values and the output integral coefficient adjustment value ΔKi is shown. The table 400 may comprise a row of the differential of luma difference value levels 352a-352g (e.g., the E_D levels). The table 350 may comprise a column of the luma difference value levels 354a-354g (e.g., the E levels). In the example shown, seven levels are shown for the differential of luma difference value levels 352a-352g and the luma difference value levels 354a-354g. The number of levels implemented may be varied according to the design criteria of a particular implementation.

The table 400 may comprise integral adjustment value levels 406aa-406gg. For each combination of the differential of luma difference value levels 352a-352g and the luma difference value levels 354a-354g, there may be a corresponding one of the integral adjustment levels 406aa-406gg. In the example shown, each of the integral adjustment levels 406aa-406gg may be one of seven different levels. The number of integral adjustment levels implemented may be varied according to the design criteria of a particular implementation.

In one example, the integral adjustment level 406aa may correspond to the differential of luma difference value level 352a and the luma difference level 354a. In another example, the integral adjustment level 406ga may correspond to the differential of luma difference value level 352g and the luma difference level 354a. In yet another example, the integral adjustment level 406ag may correspond to the differential of luma difference value level 352a and the luma difference level 354g. In still another example, the integral adjustment level 406fd may correspond to the differential of luma difference value level 352f and the luma difference level 354d. The integral adjustment value ΔKi output from the fuzzy rules block 306 may be selected from one of the integral adjustment levels 406aa-406gg. The selected one of the integral adjustment levels 406aa-406gg may be used by the integral PID coefficient block 310.

The output of fuzzy control rules block 306 may be the increase/decrease (e.g., the adjustment values ΔKp, ΔKi and/or ΔKd) of the PID control coefficients Kp, Ki and/or Kd. The table 400 may indicate the integral coefficient adjustment levels 406aa-406gg. The rules 104 may separate the integral coefficient adjustment levels 406aa-406gg into seven levels. The fuzzy rules block 306 may select the integral coefficient adjustment value ΔKi from the integral coefficient adjustment levels 406aa-406gg based on the luma difference value levels 352a-352g and the luma difference value levels 354a-354g. The seven levels for the integral coefficient adjustment value ΔKi may be Negative Big (e.g., NB), Negative Middle (e.g., NM), Negative Small (e.g., NS), Zero (e.g., Z0), Positive Small (PS), Positive Middle (e.g., PM) and/or Positive Big (e.g., PB). For example, when the luma difference value level is NM_E (e.g., 354b) and differential of the luma difference value level is PS_ED (e.g., 352e), the corresponding integral coefficient adjustment level may be Negative Small (e.g., 406eb) and the integral coefficient adjustment value ΔKi may be the NS value.

Figure 7:
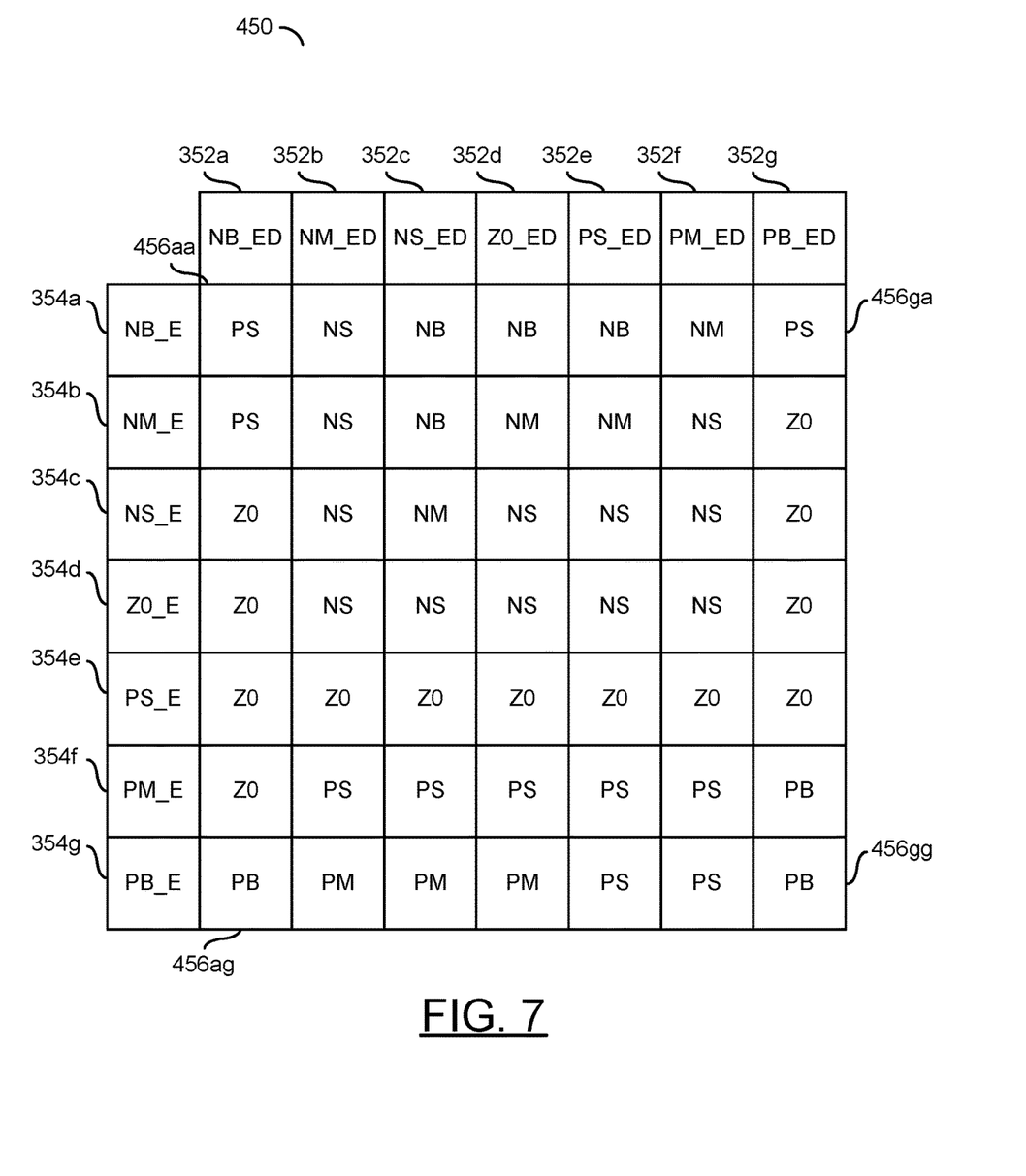
FIG. 7 is a table illustrating relationships between luma value levels and a derivative coefficient adjustment value levels.

Referring to FIG. 7, a table 450 illustrating relationships between inputs based on luma values and the output derivative coefficient adjustment value ΔKd is shown. The table 450 may comprise a row of the differential of luma difference value levels 352a-352g (e.g., the E_D levels). The table 350 may comprise a column of the luma difference value levels 354a-354g (e.g., the E levels). In the example shown, seven levels are shown for the differential of luma difference value levels 352a-352g and the luma difference value levels 354a-354g. The number of levels implemented may be varied according to the design criteria of a particular implementation.

The table 450 may comprise derivative adjustment value levels 456aa-456gg. For each combination of the differential of luma difference value levels 352a-352g and the luma difference value levels 354a-354g, there may be a corresponding one of the derivative adjustment levels 456aa-456gg. In the example shown, each of the derivative adjustment levels 456aa-456gg may be one of seven different levels. The number of derivative adjustment levels implemented may be varied according to the design criteria of a particular implementation.

In one example, the derivative adjustment level 456aa may correspond to the differential of luma difference value level 352a and the luma difference level 354a. In another example, the derivative adjustment level 456ga may correspond to the differential of luma difference value level 352g and the luma difference level 354a. In yet another example, the derivative adjustment level 456ag may correspond to the differential of luma difference value level 352a and the luma difference level 354g. In still another example, the derivative adjustment level 456fd may correspond to the differential of luma difference value level 352f and the luma difference level 354d. The derivative adjustment value ΔKd output from the fuzzy rules block 306 may be selected from one of the derivative adjustment levels 456aa-456gg. The selected one of the derivative adjustment levels 456aa-456gg may be used by the derivative PID coefficient block 312.

The output of fuzzy control rules block 306 may be the increase/decrease (e.g., the adjustment values ΔKp, ΔKi and/or ΔKd) of the PID control coefficients Kp, Ki and/or Kd. The table 450 may indicate the derivative coefficient adjustment levels 456aa-456gg. The rules 104 may separate the derivative coefficient adjustment levels 456aa-456gg into seven levels. The fuzzy rules block 306 may select the derivative coefficient adjustment value ΔKd from the derivative coefficient adjustment levels 456aa-456gg based on the luma difference value levels 352a-352g and the luma difference value levels 354a-354g. The seven levels for the derivative coefficient adjustment value ΔKd may be Negative Big (e.g., NB), Negative Middle (e.g., NM), Negative Small (e.g., NS), Zero (e.g., Z0), Positive Small (PS), Positive Middle (e.g., PM) and/or Positive Big (e.g., PB). For example, when the luma difference value level is NM_E (e.g., 354b) and differential of the luma difference value level is PS_ED (e.g., 352e), the corresponding derivative coefficient adjustment level may be Negative Medium (e.g., 456eb) and the derivative coefficient adjustment value ΔKd may be the NM value.

The fuzzy control rule-bases may be derived from expert experiences. For example, expert experiences may be used to determine flexible relationships between input values based on the luma difference value (e.g., Luma_Diff) and the adjustment values for the coefficient values (e.g., ΔKp, ΔKi and/or ΔKd). The flexible relationships may be implemented between the luma difference value levels 354a-354g, the differential of luma difference value levels 352a-352g, and the levels for the PID coefficient adjustment values (e.g., the proportional adjustment levels 356aa-356gg, the integral adjustment levels 406aa-406gg, and the derivative adjustment levels 456aa-456gg). The various levels may be pre-programmed into the firmware 102.

For example, experts may determine a particular aperture size for the lens 82 for the current luma value (e.g., to capture a desired image quality). Experts may determine various relationships between the PID coefficients that enable the size of the aperture to be changed to the desired aperture size without negatively impacting the image quality of the captured video. For the DC-Iris 204, when a step change to the luma value is detected, the fuzzy rules 104 may be implemented to get the Luma_Diff value to approach the set-point as soon as possible (e.g., to get the camera 50 to avoid over exposure of the captured image), while limiting overshoot and/or flicker. The fuzzy rules 104 may translate the expert experiences into logic implemented by the processor 100.

The target of the fuzzy rules 104 may be to make the deviation (e.g., Luma_Diff) converge quicker and overshoot less. The coefficient adjustment values ΔKp, ΔKi and/or ΔKd may adjust the PID coefficient values Kp, Ki and/or Kd to converge the luma difference value E to the set point (e.g., decrease the time of convergence) and/or decrease an amount of overshoot when adjusting the DC-Iris 204. For example, a luma difference level of NB_E, and a differential of the luma difference level of NB_ED may indicate that E is Negative Big and the luma may be very small. The Negative Big E_D may indicate that the luma may be going to be even smaller now. In the example scenario, the processor 100 may increase the force to open the iris of the lens 82 quickly (e.g., a smaller PWM duty cycle may be presented). To increase the force to open the iris of the lens 82 quickly, the processor 100 may increase Kp, decrease Ki and decrease Kd. The fuzzy rules 104 may determine that to increase Kp, decrease Ki and decrease Kd, the output for the adjustment levels may be to have the proportional adjustment level ΔKp be PB, the integral adjustment level ΔKi be NB and the derivative adjustment level ΔKd be PS. The processor 100 may generate a membership function and use a center-average de-fuzzy method to finalize the output.

The rules 104 may comprise fuzzy control rules. The levels for the differential of the luma difference levels 352a-352g, the luma difference levels 354a-354g and/or the levels for the coefficient adjustment levels (e.g., 356aa-356gg, 406aa-406gg and/or 456aa-456gg) implemented by the rules 104 may represent flexible relationships. The values for Negative Big, Negative Middle, Negative Small, Zero, Positive Small, Positive Middle and/or Positive Big for the proportional adjustment level ΔKp, the integral adjustment level ΔKi and/or the derivative adjustment level ΔKd may each be different. The actual values for Negative Big, Negative Middle, Negative Small, Zero, Positive Small, Positive Middle and/or Positive Big may be varied according to the type of the DC-Iris 204 and/or the design criteria of a particular implementation.

Generally, Negative Big may represent a larger negative value than Negative Medium and Negative Medium may represent a larger negative value than Negative Small. Generally, Positive Big may represent a larger positive value than Positive Medium and Positive Medium may represent a larger positive value than Positive Small. The range of values between the levels may be varied. For example, Positive Big may much larger than Positive Medium, while Positive Medium may be slightly larger than Positive Small and Positive Small may be barely larger than Zero. By combining the various adjustment level values, the processor may achieve any value over a few iterations of adjustments to fine-tune the DC-Iris 204. The flexible relationships between the input values based on the luma difference value (e.g., the luma difference value E and/or the differential of the luma difference value E_D) and the adjustment values for the coefficient values ΔKp, ΔKi and/or ΔKd may enable the processor 100 to generate the signal PWM_DUTY capable of making the desired change to the DC-Iris 204.

The levels for the PID coefficient adjustment values ΔKp, ΔKi and/or ΔKd may be selected in response to the selected level of the luma difference value E and the selected level of the differential of the luma difference value E_D. The levels of the luma difference value 354a-354g may be selected in response to the luma difference value E. In some embodiments, the level PB_E may be selected when E is greater than or equal to the PB_E value, the level PM_E may be selected when E is greater than or equal to the PM_E value but less than the PB_E value, the level PS_E may be selected when E is greater than or equal to the PS_E value but less than the PM_E value, the level Z0 may be selected when E is less than the PS_E value and greater than the NS_E value, the level NS_E may be selected when the E value is less than or equal to the NS_E value and greater than the NM_E value, the level NM_E may be selected when the E value is less than or equal to the NM_E value and greater than the NB_E value and the NB_E value may be selected when the E value is less than the NB_E value. In some embodiments, the levels for the luma difference value 354a-354g may be selected based on which of the luma difference values 354a-354g is closest to the luma difference value E. The levels for the differential of the luma difference value 352a-352g may be selected similarly to the levels for the luma difference value 354a-354g.

In one example, the proportional PID coefficient Kp may have a value of 0.5, the integral PID coefficient Ki may have a value of 0.0004 and the derivative PID coefficient Kd may have a value of 1. Continuing the example, the fuzzy rules 104 may determine the levels for the luma difference value E (e.g., the luma difference value levels 354a-354g). For example, the Negative Big luma difference value (e.g., NB_E) 354a may be −15, the Negative Middle luma difference value (e.g., NM_E) 354b may be −10, the Negative Small luma difference value (e.g., NS_E) 354c may be −5, the Zero luma difference value (e.g., Z0_E) 354d may be 0, the Positive Small luma difference value (PS_E) 354e may be 10, the Positive Middle luma difference value (e.g., PM_E) 354f may be 20 and the Positive Big luma difference value (e.g., PB_E) 354g may be 50. Continuing the example, the Negative Big differential of luma difference value (e.g., NB_ED) 352a may be −10, the Negative Middle differential of luma difference value (e.g., NM_ED) 352b may be −4, the Negative Small differential of luma difference value (e.g., NS_ED) 352c may be −2, the Zero differential of luma difference value (e.g., Z0_ED) 352d may be 0, the Positive Small differential of luma difference value (PS_ED) 352e may be 5, the Positive Middle differential of luma difference value (e.g., PM_ED) 352f may be 10 and the Positive Big differential of luma difference value (e.g., PB_ED) 352g may be 25.

Continuing the example where the proportional PID coefficient Kp may have a value of 0.5, the integral PID coefficient Ki may have a value of 0.0004 and the derivative PID coefficient Kd may have a value of 1, the adjustment value levels for the proportional PID coefficient ΔKp may be −0.05 for Negative Big (e.g., NB), −0.03 for Negative Medium (e.g., NM), −0.01 for Negative Small (e.g., NS), 0 for Zero (e.g., Z0), 0.01 for Positive Small (e.g., PS), 0.03 for Positive Medium (e.g., PB) and 0.05 for Positive Big (e.g., PB). The adjustment value levels for the integral PID coefficient ΔKi may be −0.00004 for Negative Big (e.g., NB), −0.00002 for Negative Medium (e.g., NM), −0.00001 for Negative Small (e.g., NS), 0 for Zero (e.g., Z0), 0.00001 for Positive Small (e.g., PS), 0.00002 for Positive Medium (e.g., PB) and 0.00004 for Positive Big (e.g., PB). The adjustment value levels for the derivative PID coefficient ΔKd may be −0.1 for Negative Big (e.g., NB), −0.05 for Negative Medium (e.g., NM), −0.03 for Negative Small (e.g., NS), 0 for Zero (e.g., Z0), 0.03 for Positive Small (e.g., PS), 0.05 for Positive Medium (e.g., PB) and 0.1 for Positive Big (e.g., PB).

For example, when the proportional PID coefficient Kp has a value of 0.5, the integral PID coefficient Ki has a value of 0.0004 and the derivative PID coefficient Kd has a value of 1, the luma difference value E is 25 and the differential of the luma difference value E_D is −2, the luma difference level may be PM_E (e.g., in some embodiments, the luma difference value E is greater than the PM_E level 20 and less than the PB_E level 50 and in some embodiments, the luma difference value E is closer to the PM_E level than any other level) and the differential of the luma difference level may be NS_ED (e.g., the differential of the luma difference value E_D is equal to the NS_ED value). PM_E may correspond to the table location 354f and NS_ED may correspond to the table location 352c. Based on the luma difference level 354f and the differential of the luma difference value 352c, the adjustment value level for the proportional PID coefficient ΔKp may correspond to 356cf (e.g., NS as shown in FIG. 5), the adjustment value level for the integral PID coefficient ΔKi may correspond to 406cf (e.g., PS as shown in FIG. 6) and the adjustment value level for the derivative PID coefficient ΔKd may correspond to 456cf (e.g., PS as shown in FIG. 7). Therefore, the proportional coefficient adjustment level ΔKp may be −0.01, the integral coefficient adjustment level ΔKi may be 0.00001 and the derivative coefficient adjustment level ΔKd may be 0.03.

Figure 8:
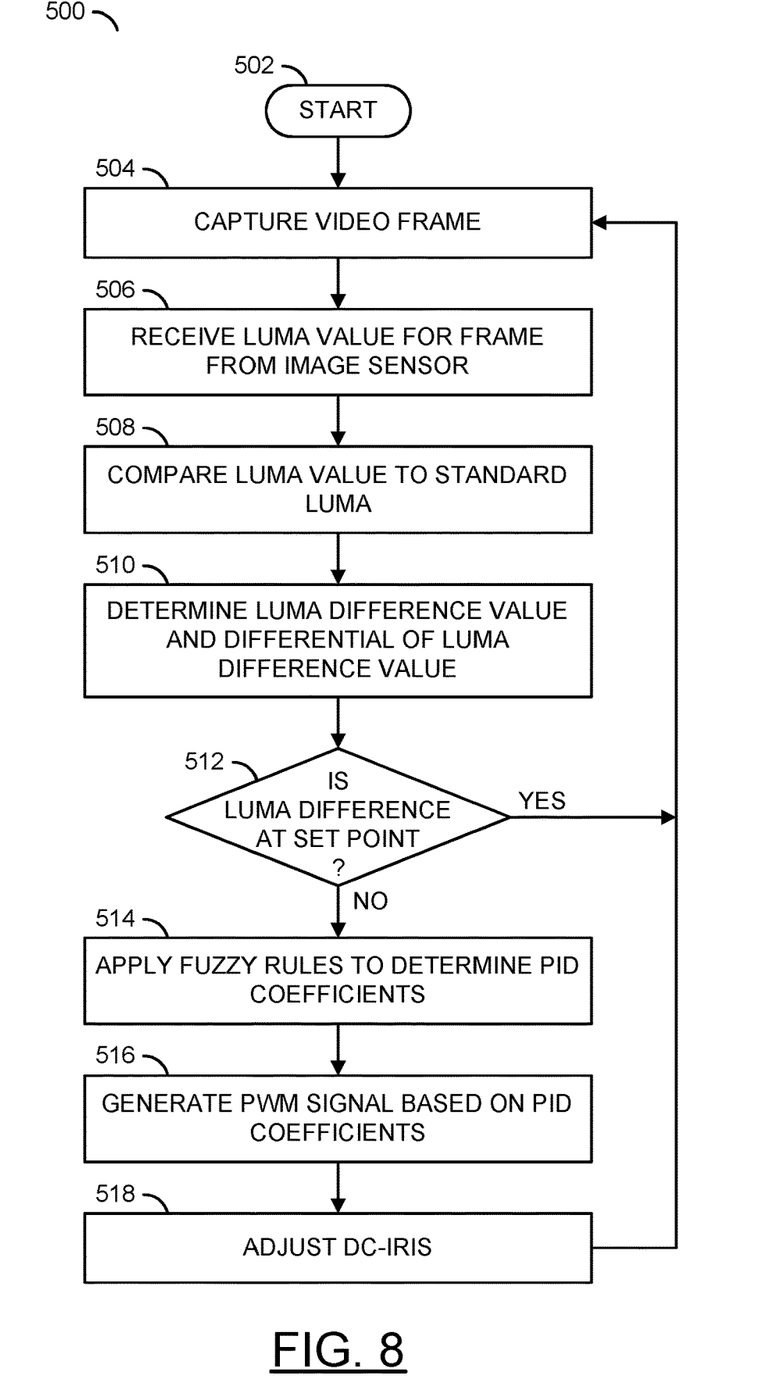
FIG. 8 is a flow diagram illustrating a method for generating coefficient values to adjust a DC-Iris lens.

Referring to FIG. 8, a method (or process) 500 is shown. The method 500 may generate coefficient values to adjust the DC-Iris 204 of the lens 82. The method 500 generally comprises a step (or state) 502, a step (or state) 504, a step (or state) 506, a step (or state) 508, a step (or state) 510, a decision step (or state) 512, a step (or state) 514, a step (or state) 516, and a step (or state) 518.

The state 502 may start the method 500. Next, in the state 504, the image sensor 84 may capture a video frame (or image). For example, the lens 82 may focus light onto the image sensor 84. The image sensor 84 may present the light information to the sensor input interface 120. The DSP module 124 may process the light information. The processor 100 may generate the video frame.

In the state 506, the DSP module 124 may receive (or determine) the luma value from for the captured video frame from the image sensor 84 (e.g., via the sensor input interface 120). Next, in the state 508, the DSP module 124 and/or the processor 100 may compare the luma value to a standard luma value. For example, the standard luma value may be a known (or pre-determined) value stored by the storage module 110 and/or by the firmware 102. In the state 510, the DSP module 124 and/or the processor 100 may determine the luma difference value E and the differential of the luma difference value E_D based on the light information received by the sensor input interface 120. Next, the method 500 may move to the decision state 512.

In the decision state 512, the processor 100 may determine whether the luma difference value E is at the set point (e.g., a value of zero). If the luma difference value E is at the set point, the method 500 may return to the state 504. If the luma difference value E is not at the set point, the method 500 may move to the state 514. In the state 514, the processor 100 may apply the fuzzy rules 104 to determine the PID coefficients (to be described in more detail in association with FIG. 9). In some embodiments, the decision state 512 may be optional. For example, the processor 100 may apply the fuzzy rules 104 even when the luma difference value E is already at the set point (e.g., the fuzzy rules 104 may determine that no adjustment is needed for the PID coefficient values). Next, the method 500 may move to the state 516.

In the state 516, the PWM module 108 may generate the PWM signal PWM_DUTY based on the PID coefficients determined by the processor 100. The signal PWM_DUTY may be further determined based on the adjustment values of the PID coefficient and/or other values (e.g., the period value T). Next, in the state 518, the lens assembly 80 may receive the signal PWM_DUTY and the DC-Iris 204 may be adjusted in response to the signal PWM_DUTY. Next, the method 500 may return to the state 504. For example, the fuzzy PID rules 104 may continually (or continuously) adjust the DC-Iris 204 as new video frames (and light data) are received. Continually adjusting the PID coefficients Kp, Ki and/or Kd may ensure the captured video frames are not over-exposed, while reducing overshoot and flicker.

Figure 9:
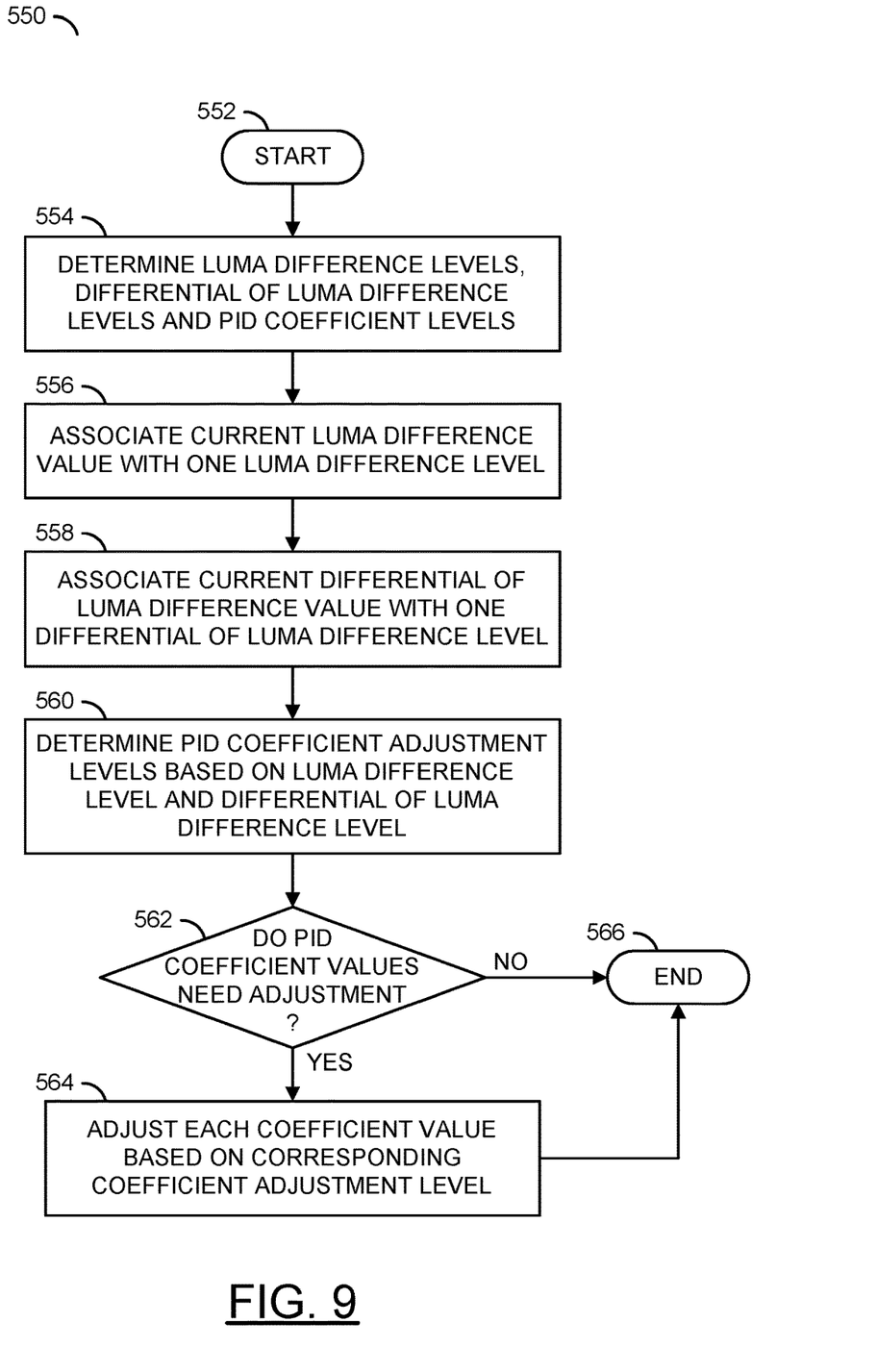
FIG. 9 is a flow diagram illustrating a method for applying fuzzy rules to determine coefficient adjustment values.

Referring to FIG. 9, a method (or process) 550 is shown. The method 550 may apply fuzzy rules to determine coefficient adjustment values. The method 550 generally comprises a step (or state) 552, a step (or state) 554, a step (or state) 556, a step (or state) 558, a step (or state) 560, a decision step (or state) 562, a step (or state) 564, and a step (or state) 566.

The state 552 may start the method 550. In the state 554, the DSP module 124 and/or the processor 100 may determine the luma difference levels 354a-354g, the differential of the luma difference levels 352a-352g and the PID coefficient levels (e.g., the proportional coefficient levels 356aa-356gg, the integral coefficient levels 406aa-406gg and/or the derivative coefficient levels 456aa-456gg). In one example, the luma difference levels 354a-354g, the differential of the luma difference levels 352a-352g and the PID coefficient levels may be pre-programmed (e.g., stored by the firmware 102). In another example, the luma difference levels 354a-354g, the differential of the luma difference levels 352a-352g and the PID coefficient levels may be determined by retrieving the levels from the storage module 110. Next, the method 550 may move to the state 556.

In the state 556, the processor 100 may use the fuzzy rules 104 to associate the current luma difference value E with one of the luma difference levels 354a-354g. In one example, the luma difference value E may be associated with the positive small (e.g., PS_E) luma difference level 354e. Next, in the state 558, the processor 100 may use the fuzzy rules 104 to associate the current differential of the luma difference value ED with one of the differential of the luma difference levels 352a-352g. In one example, the differential of the luma difference value ED may be associated with the negative medium (e.g., NM_ED) differential of the luma difference level 352b. Next, the method 550 may move to the state 560.

In the state 560, the processor 100 may use the fuzzy rules 104 to determine the PID coefficient adjustment levels based on the luma difference level and the differential of the luma difference level. For example, if the luma difference level is positive small (e.g., 354e) and the differential of the luma difference is negative medium (e.g., 352b) then the proportional coefficient adjustment level 356be may be selected, the integral coefficient adjustment level 406be may be selected and the derivative coefficient adjustment level 456be may be selected. For example, the proportional coefficient adjustment value ΔKp may be positive small (e.g., PS), the integral coefficient adjustment value ΔKi may be negative small (e.g., NS) and the derivative coefficient adjustment value ΔKd may be zero (e.g., Z0). Next, the method 550 may move to the decision state 562.

In the decision state 562, the processor 100 may use the fuzzy rules 104 to determine whether the PID coefficient values (e.g., Kp, Ki and/or Kd) need adjustment. If the PID coefficient values need adjustment, the method 550 may move to the state 564. If the PID coefficient values do not need adjustment (e.g., ΔKp, ΔKi, ΔKd: Z0, Z0, Z0), the method 550 may move to the state 566. In some embodiments, the decision state 562 may be optional. For example, the PID coefficient level of Z0 may represent no adjustment and the proportional PID coefficient block 308, the integral PID coefficient block 310 and/or the derivative PID coefficient block 312 may calculate the values Val_1, Val_2 and/or Val_3 based on a zero value for the adjustment levels ΔKp, ΔKi and/or ΔKd.

In the state 564, the processor 100 may use the fuzzy rules 104 to adjust each coefficient value (e.g., Kp, Ki and/or Kd) based on the corresponding coefficient adjustment level (e.g., ΔKp, ΔKi and/or ΔKd). Next, the method 550 may move to the state 566. The state 566 may end the method 550.

The fuzzy PID rules 104 may automatically adjust the PID coefficients (e.g., Kp, Ki, Kd) online (e.g., on-the-fly). When a step change comes (e.g., strong light arrives suddenly), E may belong to the luma difference level PB_E and E_D belongs to the differential of the luma difference level PB_ED. The corresponding output may be ΔKp, ΔKi, ΔKd: NB, PB, PB. Adjustment values of ΔKp, ΔKi, ΔKd: NB, PB, PB may lead to a quickly increasing integral coefficient value, a big derivative coefficient value and a reduced proportional coefficient value. The increased integral coefficient value and the increased derivative coefficient value may ensure the DC-Iris 204 closes fast. The reduced proportional coefficient value may prevent overshoot.

In another example, after a few cycles, if the luma difference E goes to the level PS_E and differential of the luma difference ED goes to the level NB_ED (e.g., indicating that the DC-Iris 204 is closing too fast), the adjustment coefficient output may be ΔKp, ΔKi, ΔKd: PS, NM, Z0. The decreased integral coefficient value may decrease the force for closing the DC-Iris 204.

In yet another example, after a few cycles, if the luma difference E goes to the level PS_E and the differential of the luma difference ED goes to the level NS_ED (e.g., indicating that the DC-Iris 204 convergence may be smooth), adjustment coefficient output may be ΔKp, ΔKi, ΔKd:Z0, Z0, Z0. The processor 100 may keep the current PID coefficients and wait for the Luma_Diff to reach the setpoint.

When a different type of DC-Iris 204 is used, the PID coefficients may be automatically adjusted to fit the control target. The rules 104 may not need to know the type of the DC-Iris 204 in advance. Since the fuzzy rules 104 may be derived from experience, the PID coefficients may be adjusted by the rules 104 according to the change of the values of E and/or E_D. The levels (E, E_D, and/or each of the adjustment values for the PID coefficients) may be pre-determined and/or stored by the firmware 102.

The fuzzy PID rules 104 implemented by the processor 100 may be implemented to have a fast convergence speed and a small overshoot. Implementing the fuzzy rules 104 may help the camera 50 capture good image quality (e.g., across varying lighting environments). The fuzzy PID rules 104 may enable the processor 100 to implement a robust control system for different types of the DC-Iris 204. With the fuzzy PID rules 104 implemented by the processor 100, manufacturers of the camera 50 may not need to tune PID coefficients (e.g., Kp, Ki and/or Kd) for each type of the DC-Iris 204 used in a product line. For example, the processor 100 may be used in a product line that implements cameras having more than one type of the DC-Iris 204 without having to tune the PID coefficients. Since the fuzzy PID rules 104 may detect and/or adjust the PID coefficients automatically, implementing the processor 100 may improve productiveness. No additional controller chips may be needed to be compatible with the output of the fuzzy rules 104. The PID coefficients output by the processor 100 (e.g., the signal PWM_DUTY) may be compatible with components of the camera circuit 90 and/or the lens assembly 80. Formatting the signal PWM_DUTY to be compatible with the components of the camera circuit 90 and/or the lens assembly 80 may enable the processor 100 to provide a low cost implementation of a DC-Iris control system.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions and structures illustrated in the diagrams of FIGS. 1 to 9 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

While the invention has been particularly shown and described with reference to embodiments thereof, it will be understood by those skilled in the art that various changes in form and details may be made without departing from the scope of the invention.

The invention claimed is:

1. An apparatus comprising:
an interface to a lens iris; and
a processor configured to (a) present to said interface a signal configured to adjust said lens iris and (b) adjust coefficient values for said signal, wherein (i) said coefficient values are adjusted to converge a luma difference value to a set point, (ii) said adjustment of said coefficient values is based on flexible relationships between (a) input values based on said luma difference value and (b) adjustment values for said coefficient values and (iii) said processor separates (a) said input values for said luma difference value into first levels, (b) values for a differential of said luma difference value into second levels and (c) said adjustment values for said coefficient values into a plurality of third levels.

2. The apparatus according to claim 1, wherein said processor implements fuzzy control rules for separating (a) said input values for said luma difference value into said first levels, (b) said values for said differential of said luma difference value into said second levels and (c) said adjustment values for said coefficient values into said plurality of third levels.

3. The apparatus according to claim 2, wherein said fuzzy control rules are pre-determined based on expert experiences.

4. The apparatus according to claim 1, wherein said coefficient values are adjusted to decrease a time of convergence of said luma difference value.

5. The apparatus according to claim 1, wherein said coefficient values are adjusted to decrease an amount of overshoot.

6. The apparatus according to claim 1, wherein said coefficient values comprise a proportional coefficient value, an integral coefficient value and a derivative coefficient value.

7. The apparatus according to claim 1, wherein said set point for said luma difference value is zero.

8. The apparatus according to claim 1, wherein said adjustment values for said coefficient values are selected from said plurality of third levels based on one of said first levels that corresponds to said luma difference value and one of said second levels that corresponds to said differential of said luma difference value.

9. The apparatus according to claim 1, wherein said flexible relationships between (a) said input values based on said luma difference value and (b) said adjustment values for said coefficient values are determined based on said first levels, said second levels and said plurality of third levels.

10. The apparatus according to claim 1, wherein said apparatus is configured to automatically adjust said coefficient values online.

11. The apparatus according to claim 1, wherein (i) said lens iris can be changed to a second type of said lens iris and (ii) said coefficient values are adjusted to fit a control target for second type of said lens iris.

12. The apparatus according to claim 1, wherein said signal is a pulse width modulation signal for driving a coil of said lens iris.

13. The apparatus according to claim 1, wherein said processor is further configured to determine said luma difference value based on a luma value and a pre-determined standard luma value.

14. The apparatus according to claim 13, wherein said luma value is received from an image sensor.

15. The apparatus according to claim 1, wherein each of said coefficient values are determined based on a corresponding one of said adjustment values and a current value of said coefficient values.

16. The apparatus according to claim 1, wherein said adjustment values are an increase/decrease of said coefficient values.

* * * * *